United States Patent
Jensen et al.

(10) Patent No.: US 11,515,600 B2
(45) Date of Patent: Nov. 29, 2022

(54) ELECTRIC VEHICLE BATTERY ENCLOSURE WITH SEALANT AND SEAL BEAD HEIGHT MAINTENANCE

(71) Applicant: GM Global Technology Operations LLC, Detroit, MI (US)

(72) Inventors: Charles E. Jensen, Shelby Township, MI (US); Terry A. Swartzell, Ann Arbor, MI (US); Andrew W. White, Shelby Township, MI (US); James A. Rochon, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 343 days.

(21) Appl. No.: 16/708,138

(22) Filed: Dec. 9, 2019

(65) Prior Publication Data

US 2021/0175482 A1    Jun. 10, 2021

(51) Int. Cl.
- *H01M 50/271* (2021.01)
- *H01M 50/26* (2021.01)
- *H01M 50/249* (2021.01)
- *H01M 50/244* (2021.01)

(52) U.S. Cl.
CPC ....... *H01M 50/271* (2021.01); *H01M 50/244* (2021.01); *H01M 50/249* (2021.01); *H01M 50/26* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 10,118,475 B2 | 11/2018 | Sugizaki et al. | |
| 2010/0136402 A1* | 6/2010 | Hermann | H01M 10/6567 429/185 |
| 2013/0252058 A1* | 9/2013 | Kim | H01M 50/20 429/99 |
| 2014/0284125 A1* | 9/2014 | Katayama | B60L 3/0046 180/68.5 |
| 2015/0255764 A1* | 9/2015 | Loo | B60K 1/04 429/149 |
| 2016/0293914 A1* | 10/2016 | Miller | H01M 50/20 |
| 2019/0081297 A1* | 3/2019 | Nakamori | B60L 50/64 |

OTHER PUBLICATIONS

Chinese Office Action for Chinese Application No. 202011398660.1; Report dated Oct. 14, 2022 (pp. 1-12).

* cited by examiner

*Primary Examiner* — Gregg Cantelmo
(74) *Attorney, Agent, or Firm* — Cantor Colburn LLP

(57) ABSTRACT

Electric vehicle battery enclosures and methods of assembling electric vehicle battery enclosures involve a base portion to hold one or more batteries that provide motive power to an all-electric or hybrid electric vehicle. An electric vehicle battery enclosure includes a cover portion to mate with the base portion to enclose the one or more batteries, and a sealant to create a bond between the base portion and the cover portion around an entire perimeter of the enclosure and to seal the enclosure based on a uniform height of the sealant around the perimeter of the enclosure.

16 Claims, 6 Drawing Sheets

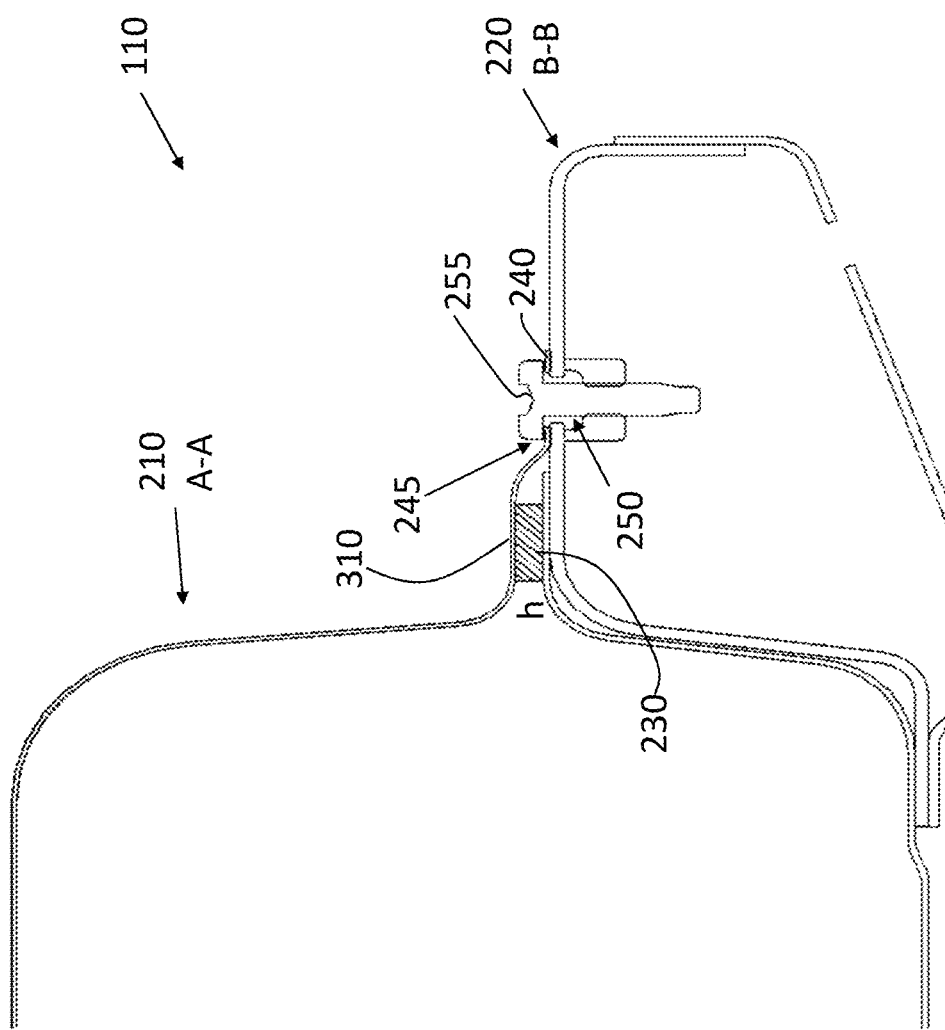

ELECTRIC VEHICLE BATTERY ENCLOSURE WITH SEALANT AND SEAL BEAD HEIGHT MAINTENANCE

INTRODUCTION

The subject disclosure relates to an electric vehicle battery enclosure with a sealant and seal bead height maintenance.

Electric-vehicle batteries (EVBs), also referred to as traction batteries, provide motive power in all-electric or hybrid-electric vehicles. EVBs differ from batteries used by other vehicle systems (e.g., starting, lighting, ignition) because they are designed to power the vehicle for sustained periods of time. The EVBs are a pack of two or more batteries (e.g., lithium-ion batteries), each of which may include several hundred individual battery cells. EVBs may be packaged together with temperature, voltage, and current sensors. During use, the EVBs must be stored in a sealed enclosure to protect the battery cells from damage and debris and to contain the heat and gasses produced by the EVBs. While fasteners and rubber strip-type seals are known, an effective lower cost option would be appreciated. Accordingly, it is desirable to provide an electric vehicle batter enclosure with a sealant and seal bead height maintenance.

SUMMARY

In one exemplary embodiment, an electric vehicle battery enclosure includes a base portion to hold one or more batteries that provide motive power to an all-electric or hybrid electric vehicle, and a cover portion to mate with the base portion to enclose the one or more batteries. The enclosure also includes a sealant to create a bond between the base portion and the cover portion around an entire perimeter of the enclosure and to seal the enclosure based on a uniform height of the sealant around the perimeter of the enclosure.

In addition to one or more of the features described herein, the cover portion includes two or more tabs extending from a perimeter of the cover portion.

In addition to one or more of the features described herein, each of the two or more tabs includes an opening.

In addition to one or more of the features described herein, the base portion includes an opening corresponding with each opening in the two or more tabs.

In addition to one or more of the features described herein, a fastener is disposed through the opening in each of the two or more tabs and into the opening of the base portion corresponding with the tab.

In addition to one or more of the features described herein, a portion of the cover portion that contacts the sealant is farther from the base portion than each of the two or more tabs of the cover portion.

In addition to one or more of the features described herein, the enclosure also includes an opening between a surface of the base portion on which the sealant is disposed and the portion of the cover portion that contacts the sealant.

In addition to one or more of the features described herein, the opening has a uniform height dimension over the entire perimeter of the enclosure.

In addition to one or more of the features described herein, the two or more tabs are arranged at intermittent locations around the perimeter of the cover portion.

In addition to one or more of the features described herein, the sealant is urethane, epoxy, or a room-temperature-vulcanizing silicone.

In another exemplary embodiment, a method of assembling an electric vehicle battery enclosure includes configuring a base portion to hold one or more batteries that provide motive power to an all-electric or hybrid electric vehicle, and arranging a cover portion to mate with the base portion to enclose the one or more batteries. The method also includes disposing a sealant to create a bond between the base portion and the cover portion around an entire perimeter of the enclosure and to seal the enclosure based on a uniform height of the sealant around the entire perimeter of the enclosure.

In addition to one or more of the features described herein, the method also includes configuring the cover portion to include two or more tabs extending from a perimeter of the cover portion.

In addition to one or more of the features described herein, the method also includes including an opening in each of the two or more tabs.

In addition to one or more of the features described herein, the configuring the base portion includes forming an opening corresponding with each opening in the two or more tabs.

In addition to one or more of the features described herein, the method also includes disposing a fastener through the opening in each of the two or more tabs and into the opening of the base portion corresponding with the tab.

In addition to one or more of the features described herein, the configuring the cover portion includes forming a portion of the cover portion that contacts the sealant to be farther from the base portion than each of the two or more tabs of the cover portion.

In addition to one or more of the features described herein, the method also includes creating an opening between a surface of the base portion on which the sealant is disposed and the portion of the cover portion that contacts the sealant.

In addition to one or more of the features described herein, the creating the opening includes defining the opening to have a uniform height dimension over the entire perimeter of the enclosure such that the opening results in the uniform height of the sealant around the entire perimeter of the enclosure.

In addition to one or more of the features described herein, the method also includes arranging the two or more tabs at intermittent locations around the perimeter of the cover portion.

In addition to one or more of the features described herein, disposing the sealant includes disposing urethane, epoxy, or a room-temperature-vulcanizing silicone.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 6 is a cross-sectional view of the EVB enclosure according to one or more embodiments.

DETAILED DESCRIPTION

Figure 1:
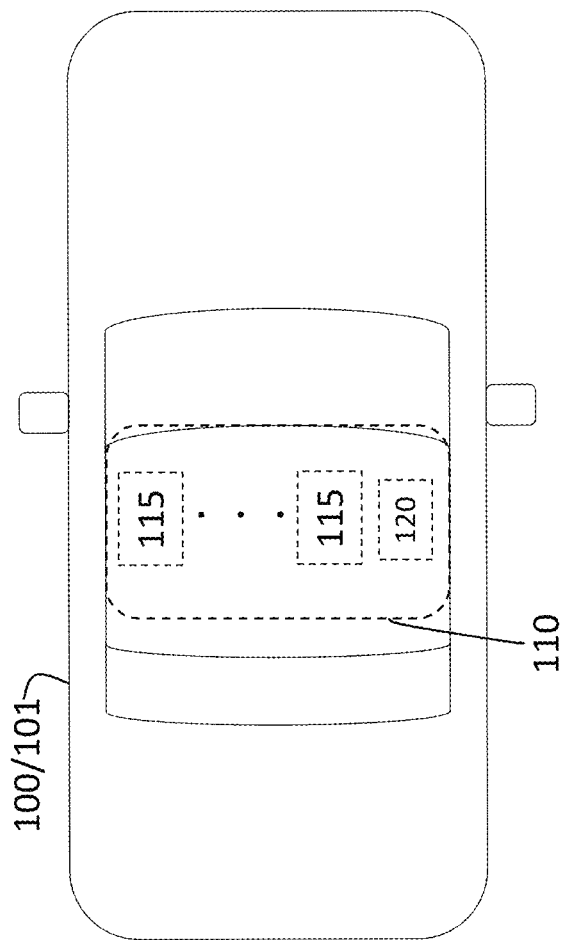
FIG. 1 is a block diagram of a vehicle that includes an electric vehicle battery enclosure (EVB enclosure) with a sealant and with seal bead height maintenance according to one or more embodiments.

The following description is merely exemplary in nature and is not intended to limit the present disclosure, its application or uses. It should be understood that throughout the drawings, corresponding reference numerals indicate like or corresponding parts and features.

As previously noted, the batteries of an electric or hybrid vehicle (i.e., EVBs) must be protected in a secure enclosure during operation of the vehicle. In addition to the two sides of the enclosure being bonded together, they must also be sealed such that debris is kept out and heat and gasses are contained. Embodiments of the systems and methods detailed herein relate to an electric vehicle battery enclosure with a sealant and seal bead height maintenance. The sealant bonds the two sides of the enclosure together, and the seal bead height maintenance ensures a seal. That is, while seal bead height uniformity is not critical to bonding, maintaining a seal bead height that is uniform over the perimeter of the enclosure ensures a proper seal. Step-down tabs spaced around one part of a two-part enclosure are used to maintain a uniform opening between the two parts of the enclosure where the sealant bead is disposed for bonding and sealing.

In accordance with an exemplary embodiment, FIG. 1 is a block diagram of a vehicle 100 that includes an electric vehicle battery enclosure (EVB enclosure) 110 with a sealant 230 (FIG. 2) and with seal bead height maintenance. The EVB enclosure 110 includes two or more EVBs 115, as well as other components 120 (e.g., temperature sensor). The vehicle 100 is all-electric or an electric-hybrid that derives motive power from the EVBs 115. The exemplary vehicle 100 shown in FIG. 1 is an automobile 101. Other exemplary vehicles 100 include trucks, construction equipment, farm equipment, and automated factory equipment. The EVB enclosure 110 is further detailed with reference to FIGS. 2-6.

Although a generally rectangular shape is indicated in the center portion of the automobile 101, the shape and location of the EVB enclosure 110 is not intended to be limited by the exemplary depiction in FIG. 1. The numbers and arrangements of the EVBs 115 and other components 120 within the EVB enclosure 110 is also not intended to be limited by the exemplary depiction. The vehicle 100 includes may other components that are not shown or detailed herein. For example, the vehicle 100 may include one or more sensors (e.g., radar system, lidar system, camera) that obtain information about the vehicle 100 and its environment. The vehicle 100 may also include controllers that facilitate autonomous or semi-autonomous operation and, additionally, monitor the EVBs 115 and other components 120.

Figure 2:
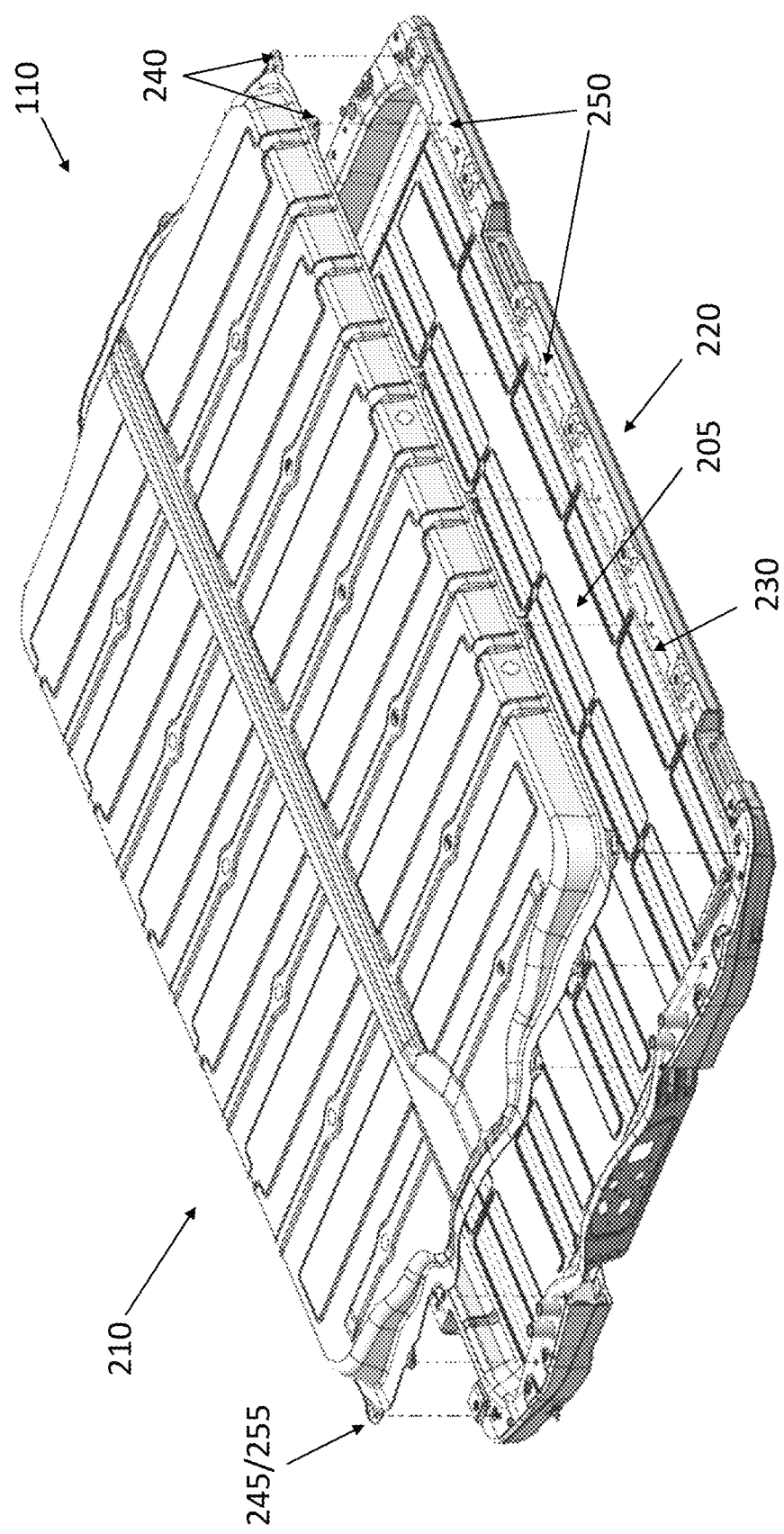
FIG. 2 shows the EVB enclosure with a sealant and with seal bead height maintenance according to one or more embodiments.

FIG. 2 shows the EVB enclosure 110 with a sealant 230 and with seal bead height maintenance according to one or more embodiments. The sealant 230 may be urethane, for example. Alternately, the sealant 230 may be epoxy or a room-temperature-vulcanizing silicone. As shown the EVB enclosure 110 includes a first part, which is the top according to the orientation shown in FIG. 2, and is referred to as a cover portion 210 for explanatory purposes. The EVB enclosure 110 also includes a second part, which is the bottom according to the orientation shown in FIG. 2, and is referred to as a base portion 220 for explanatory purposes. The base portion 220 may hold a number of EVBs 115 and other components 120 in its interior portion 205. A sealant 230 is disposed all around the perimeter of the base portion 220 of the EVB enclosure 110. As indicated, tabs 240 of the cover portion 210 include openings 245 that facilitate a screw 255 or other fastener to pass through and connect the tabs 240 with corresponding openings 250 of the base portion 220 of the EVB enclosure 110. As FIG. 2 indicates, the tabs 240 are disposed intermittently (e.g., at uniform distances from each other) at the perimeter of the cover portion 210 of the EVB enclosure 110. The tabs 240 of the cover portion 210 are closer to the base portion 220 than any other portion of the cover portion 210. This arrangement of the tabs 240 allows seal bead height maintenance for the sealant 230, as further discussed.

Figure 3:
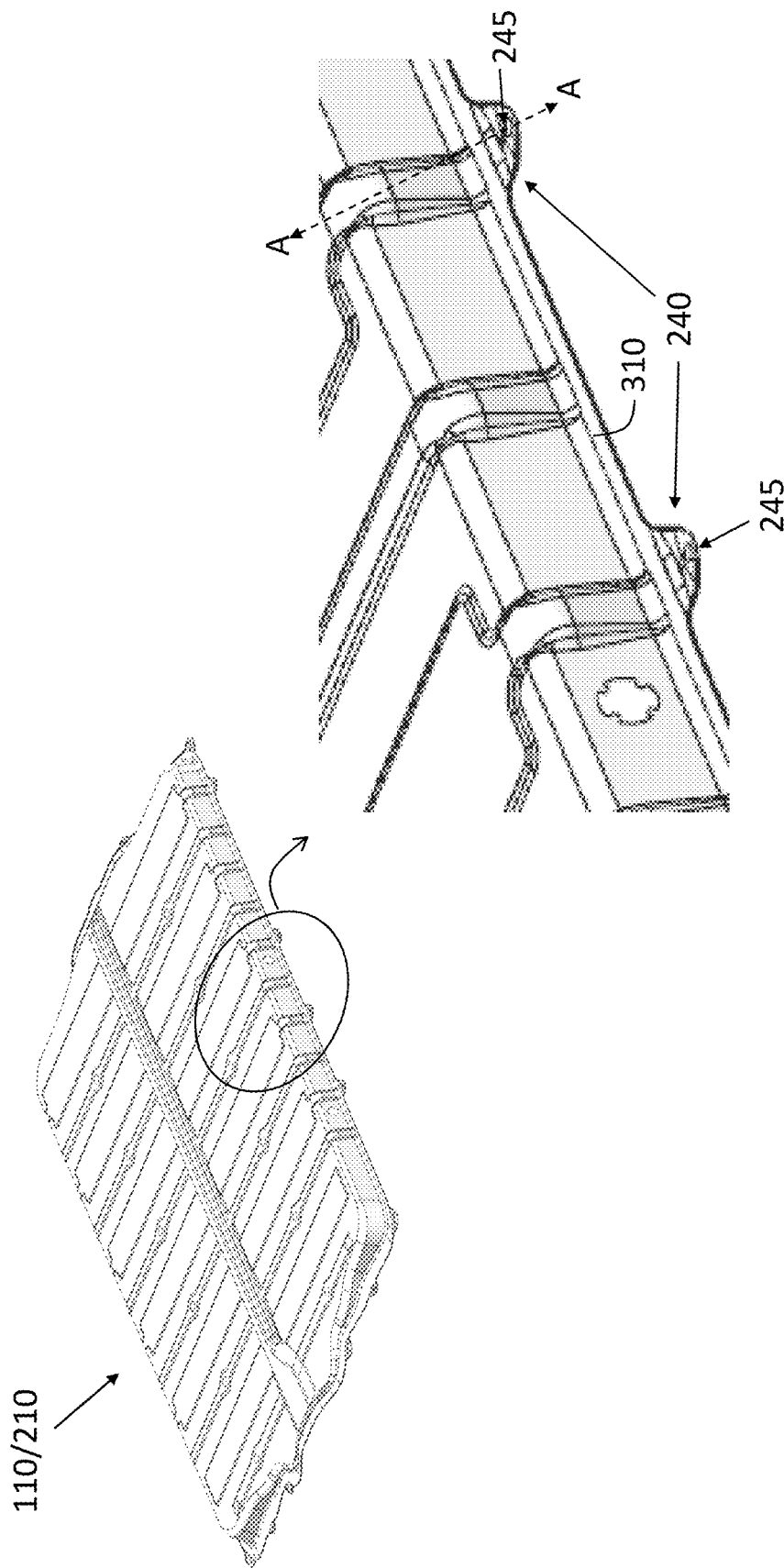
FIG. 3 details the cover portion of the EVB enclosure according to one or more embodiments.

FIG. 3 details the cover portion 210 of the EVB enclosure 110 according to one or more embodiments. An expanded view is provided for a portion of the cover portion 210 of the EVB enclosure 110 that is circled. The expanded view shows two tabs 240 and openings 245 through the tabs 240. The expanded view also shows a perimeter portion 310 that contacts the sealant 230 (FIG. 2) disposed on the base portion 220 of the EVB enclosure 110 when the cover portion 210 and base portion 220 are brought together. The tabs 240 are closer to the base portion 220 than the perimeter portion 310. That is, according to the orientation shown in FIGS. 2 and 3, the tabs 240 extend lower than the perimeter portion 310, and the perimeter portion 310 is level (i.e., at a uniform height) over the entire perimeter of the cover portion 210 of the EVB enclosure 110. This is shown in FIG. 5, for example, which indicate a cross-section through A-A of FIG. 3.

Figure 4:
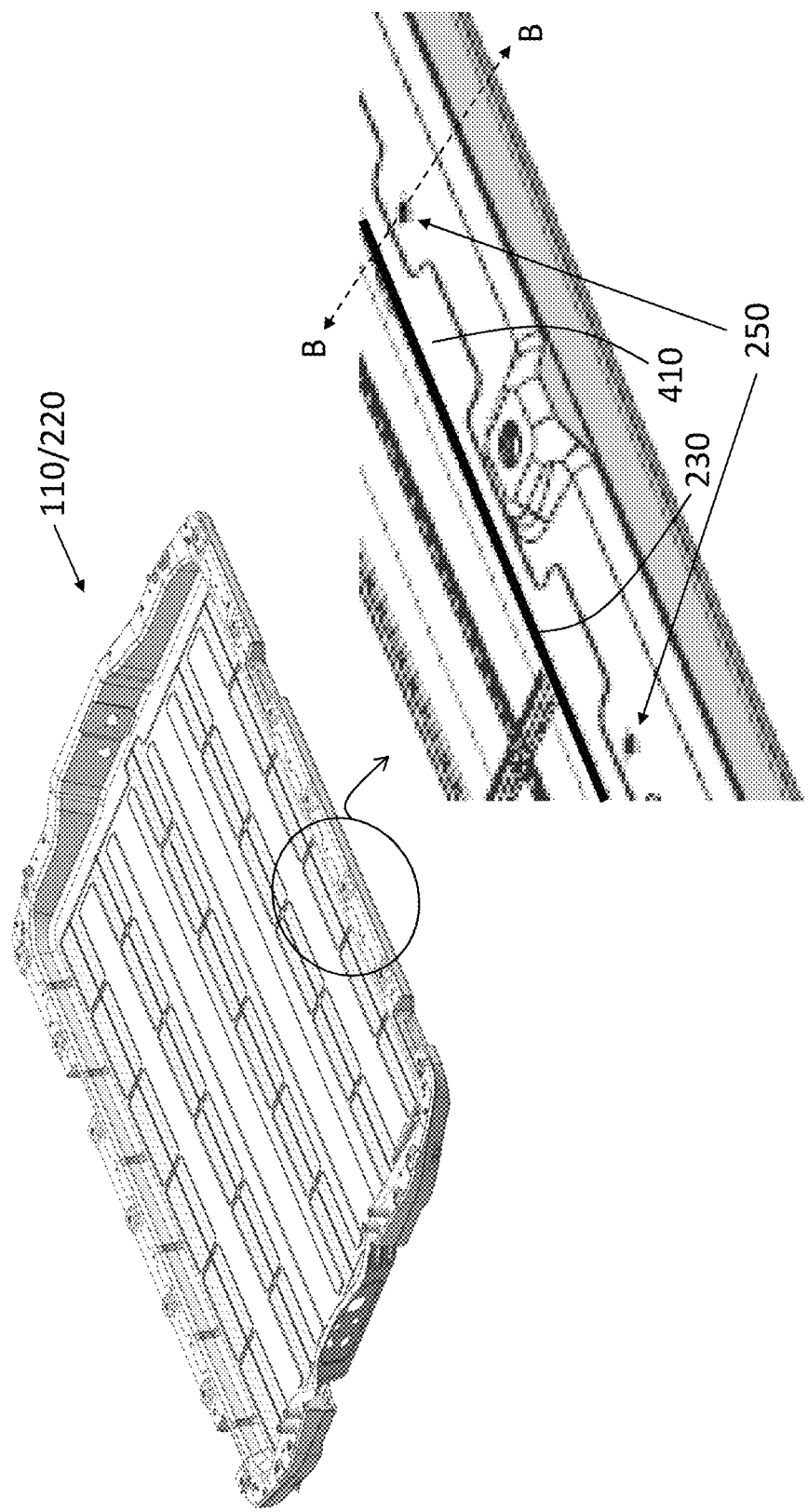
FIG. 4 details the base portion of the EVB enclosure according to one or more embodiments.

FIG. 4 details the base portion 220 of the EVB enclosure 110 according to one or more embodiments. An expanded view is provided for a portion of the base portion 220 of the EVB enclosure 110 that is circled. The expanded view shows two openings 250 and a portion of the sealant 230 that extends around the periphery of the base portion 220 of the EVB enclosure 110. The sealant 230 is disposed on a surface 410. This surface 410 is level over the perimeter of the base portion 220 of the EVB enclosure 110. The cross-section through B-B is shown in FIG. 5.

Figure 5:
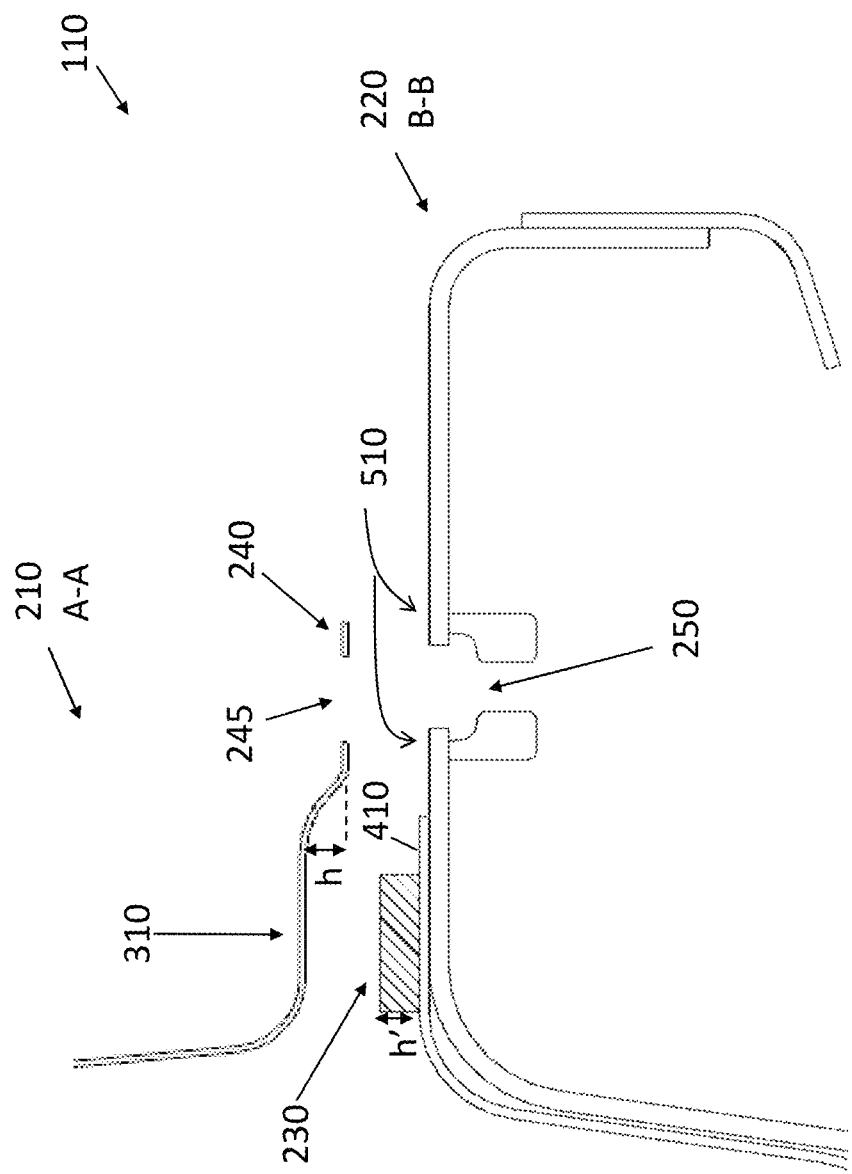
FIG. 5 is a cross-sectional view of the EVB enclosure according to one or more embodiments.

FIG. 5 is a cross-sectional view of the EVB enclosure 110 according to one or more embodiments. Specifically, cross-section A-A through the cover portion 210 of the EVB enclosure 110, which is indicated in FIG. 3, and cross-section B-B through the base portion 220 of the EVB enclosure 110, which is indicated in FIG. 4, are shown. The cross-sectional views shown in FIG. 5 are prior to bonding and sealing the EVB enclosure 110. The cross-sectional view of the cover portion 210 of the EVB enclosure 110 shows the perimeter portion 310 and a tab 240 with an opening 245. This cross-sectional view indicates the height difference of h between the perimeter portion 310 and the tab 240. The cross-sectional view of the base portion 220 of the EVB enclosure 110 shows the sealant 230 on the surface 410 and the opening 250. The height h' of the sealant 230 is indicated.

Prior to the cover portion 210 and the base portion 220 contacting each other, the height h' (e.g., 6 millimeters (mm)) of the sealant 230 is greater than the height difference h (e.g., 4 mm) between the perimeter portion 310 and the tab 240. As a result, when the cover portion 210 and the base portion 220 contact each other (i.e., when the tab 240 contacts surface 510), the perimeter portion 310 of the cover portion 210 deforms the height h' of the sealant 230 to the height difference h between the perimeter portion 310 and the tab 240. This height difference h is the seal bead height that is maintained for the sealant 230 to seal uniformly over the perimeter of the base portion 220 of the EVB enclosure 110.

FIG. 6 is a cross-sectional view of the EVB enclosure 110 according to one or more embodiments. Again, cross-section A-A through the cover portion 210 of the EVB enclosure 110 and cross-section B-B through the base portion 220 of the EVB enclosure 110 are shown. Unlike the cross-sectional view shown in FIG. 5, the cross-sectional view shown in FIG. 6 is after bonding and sealing of the EVB enclosure 110. Thus, the sealant 230 is shown to have a height of h, which is the height difference between the perimeter portion 310 and the tab 240, as indicated in FIG. 5. In addition, a screw 255 is shown through the opening 245 of the tab 240 and through the corresponding opening 250 of the base portion 220 of the EVB enclosure 110. As previously noted, rather than a screw 255, a different fastener may be used according to alternate embodiments.

As noted in the discussion of FIG. 2, the tabs 240 are disposed intermittently around the perimeter of the cover portion 210 of the EVB enclosure 110. Thus, depending on where a cross-section is taken, the tab 240 and screw 255 may not be visible, but the perimeter portion 310 will always be visible. Further, as previously noted, the perimeter portion 310 of the cover portion 210 and the surface 410 (FIG. 5) of the base portion 220 are both level over the respective perimeters of the cover portion 210 and the base portion 220 of the EVB enclosure 110. Thus, the opening between the perimeter portion 310 of the cover portion 210 and the surface 410 of the base portion 220, which is the seal bead height h of the sealant 230 between the perimeter portion 310 of the cover portion 210 and the surface 410 of the base portion 220, is maintained uniformly over the perimeter of the EVB enclosure 110.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electric vehicle battery enclosure, the enclosure comprising:
a base portion configured to hold one or more batteries that provide motive power to an all-electric or hybrid electric vehicle;
a cover portion configured to mate with the base portion to enclose the one or more batteries; and
a sealant configured to create a bond between the base portion and the cover portion around an entire perimeter of the enclosure and to seal the enclosure based on a uniform height of the sealant around the perimeter of the enclosure, wherein the cover portion includes two or more tabs extending from a perimeter of the cover portion, a portion of the cover portion that contacts the sealant is formed as a single planar piece and is farther from the base portion than each of the two or more tabs of the cover portion by a distance h, and the portion of the cover portion is configured to deform the sealant from a height greater than h to the uniform height.

2. The enclosure according to claim 1, wherein each of the two or more tabs includes an opening.

3. The enclosure according to claim 2, wherein the base portion includes an opening corresponding with each opening in the two or more tabs.

4. The enclosure according to claim 3, wherein a fastener is disposed through the opening in each of the two or more tabs and into the opening of the base portion corresponding with the tab.

5. The enclosure according to claim 1, further comprising an opening between a surface of the base portion on which the sealant is disposed and the portion of the cover portion that contacts the sealant.

6. The enclosure according to claim 5, wherein the opening has a uniform height dimension over the entire perimeter of the enclosure.

7. The enclosure according to claim 1, wherein the two or more tabs are arranged at intermittent locations around the perimeter of the cover portion.

8. The enclosure according to claim 1, wherein the sealant is urethane, epoxy, or a room-temperature-vulcanizing silicone.

9. A method of assembling an electric vehicle battery enclosure, the method comprising:
configuring a base portion to hold one or more batteries that provide motive power to an all-electric or hybrid electric vehicle;
arranging a cover portion to mate with the base portion to enclose the one or more batteries;
disposing a sealant to create a bond between the base portion and the cover portion around an entire perimeter of the enclosure and to seal the enclosure based on a uniform height of the sealant around the entire perimeter of the enclosure; and
configuring the cover portion to include two or more tabs extending from a perimeter of the cover portion, wherein the configuring the cover portion includes forming a portion of the cover portion that contacts the sealant to be a single planar piece and to be farther from the base portion than each of the two or more tabs of the cover portion by a distance h.

10. The method according to claim 9, further comprising including an opening in each of the two or more tabs.

11. The method according to claim 10, wherein the configuring the base portion includes forming an opening corresponding with each opening in the two or more tabs.

12. The method according to claim 11, further comprising disposing a fastener through the opening in each of the two or more tabs and into the opening of the base portion corresponding with the tab.

13. The method according to claim 9, further comprising creating an opening between a surface of the base portion on which the sealant is disposed and the portion of the cover portion that contacts the sealant.

14. The method according to claim 13, wherein the creating the opening includes defining the opening to have a uniform height dimension over the entire perimeter of the enclosure such that the opening results in the uniform height of the sealant around the entire perimeter of the enclosure.

15. The method according to claim 9, further comprising arranging the two or more tabs at intermittent locations around the perimeter of the cover portion.

16. The method according to claim 9, wherein disposing the sealant includes disposing urethane, epoxy, or a room-temperature-vulcanizing silicone.

\* \* \* \* \*